(12) United States Patent
Bearman et al.

(10) Patent No.: US 6,530,773 B2
(45) Date of Patent: Mar. 11, 2003

(54) APPARATUS FOR ATTACHING FIBROUS BATT TO PLASTIC SUBSTRATE

(75) Inventors: John A. Bearman, Hudsonville, MI (US); Bret A. Hoeksema, Zeeland, MI (US)

(73) Assignee: J. R. Automation Technologies, Inc., Holland, MI (US)

( * ) Notice: Subject to any disclaimer, the term of this patent is extended or adjusted under 35 U.S.C. 154(b) by 0 days.

(21) Appl. No.: 09/479,111

(22) Filed: Jan. 7, 2000

(65) Prior Publication Data

US 2002/0033553 A1 Mar. 21, 2002

(51) Int. Cl.[7] .............................................. B29C 43/18
(52) U.S. Cl. ....................................... 425/503; 425/517
(58) Field of Search ................................. 425/500, 503, 425/508, 517; 264/248

(56) References Cited

U.S. PATENT DOCUMENTS

| | | | |
|---|---|---|---|
| 3,640,655 A | * 2/1972 | Wallace | 425/109 |
| 4,076,484 A | * 2/1978 | Armour et al. | 425/525 |
| 4,741,916 A | * 5/1988 | Heidel et al. | 425/549 |
| 5,018,957 A | 5/1991 | Assink et al. | 425/112 |
| 5,603,150 A | 2/1997 | Assink et al. | 29/91.8 |
| 5,871,784 A | 2/1999 | Assink et al. | 425/383 |

* cited by examiner

*Primary Examiner*—Jan H. Silbaugh
*Assistant Examiner*—Joseph S. Del Sole
(74) *Attorney, Agent, or Firm*—Price, Heneveld, Cooper, DeWitt & Litton

(57) ABSTRACT

An apparatus for attaching a fibrous material to a plastic substrate involves positioning a fibrous material over a surface of a plastic substrate, directing a stream of heated air through the fibrous material to melt the surface of the plastic substrate, compressing the fibrous material against the melted surface of the plastic substrate, and allowing the melted surface of the plastic substrate to cool and resolidify, whereby fibers of the fibrous material become embedded in the resolidified plastic. The apparatus comprises a fixture for supporting the plastic substrate and a fibrous material over a surface of the plastic substrate, a tool supported adjacent the fixture for directing heated, pressurized air toward the plastic substrate and for compressing the fibrous material against the plastic substrate, and an actuator for reciprocating the tool.

14 Claims, 2 Drawing Sheets

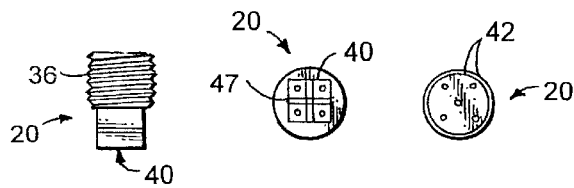
Fig. 4   Fig. 5   Fig. 6
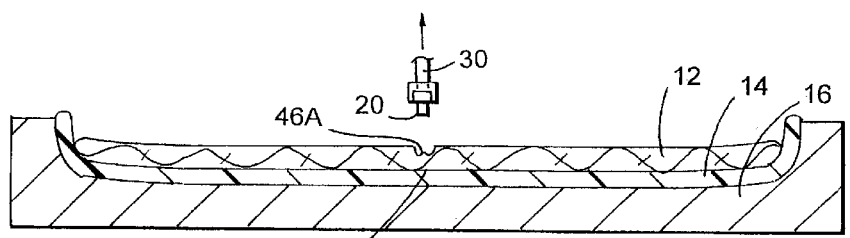
Fig. 3
Fig. 2
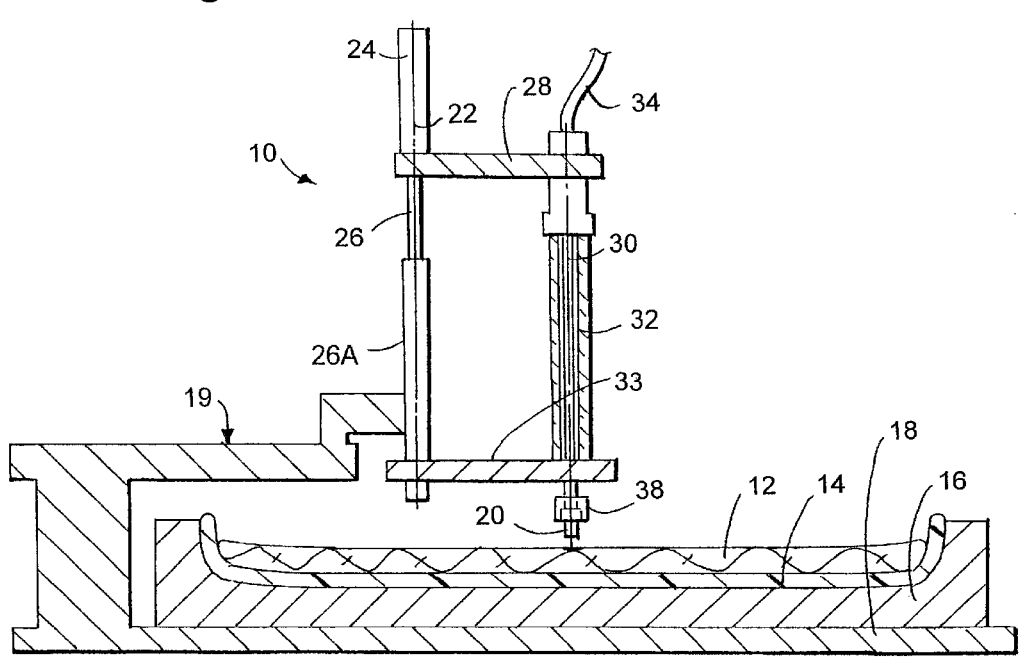
Fig. 1

APPARATUS FOR ATTACHING FIBROUS BATT TO PLASTIC SUBSTRATE

FIELD OF THE INVENTION

This invention relates to a method and apparatus for attaching a fibrous batt of material, such as sound absorbing material, to a heat fusible plastic substrate.

BACKGROUND OF THE INVENTION

Sound absorbing fibrous materials or batts are commonly attached to the inner wall of plastic interior automotive panels to absorb sound and reduce noise in the passenger compartment of automobiles. The fibrous materials deaden noises generated by vibrating parts in the automobile and give the driver and passengers a feeling of riding in a more solid, well built vehicle. Among the most commonly employed sound absorbing materials used are shotties, which are fibrous sound insulating batts made by shredding and needling scrap and/or recycled materials, typically scrap and/or recycled plastics such as polypropylene, acrylonitrile-butadiene-styrene terpolymer (ABS), polyethylene terephthalate (PET), etc. Other examples of fibrous sound absorbing materials include glass fiber, synthetic fiber, natural fiber (such as wool, cotton, etc.), and combinations thereof.

Sound absorbing fibrous materials are typically attached with adhesives to various plastic automotive interior panels, such as door panels, interior trim panels, pillar panels, headliners, dashes, lift-gate panels, visors, and the like. A disadvantage with the use of adhesives for attaching fibrous sound absorbing materials to plastic automotive interior panels is that a relatively high cycle time is required for each part, regardless of whether the adhesive is applied manually or with automated equipment. In either case, the equipment used to apply the adhesive is prone to require significant maintenance, especially on account of the tendency for plugging to occur at spray nozzles, metering orifices, and the like. Adhesives are also relatively expensive. A further disadvantage with adhesives is that there is inevitably a certain amount of adhesive material which will become air-borne during application and will pollute the immediate environment, presenting possible health concerns and requiring frequent cleaning of surfaces where air-borne adhesives accumulate.

In an effort to eliminate the use of adhesives for attaching a fibrous sound absorbing material to plastic automotive interior panels, ultrasonic welding has been employed. Ultrasonic welding techniques involve the generation of high frequency vibrations which are directed toward a location on a plastic substrate, such as an automotive body panel. The vibrations cause polymer molecules at a selected location of the plastic substrate to vibrate and heat up to the melting point of the plastic. Thereafter, the fibrous material is pressed against the melted plastic and becomes physically bound to the plastic substrate as the melted plastic cools and resolidifies. Although the use of ultrasonic welding eliminates the need for adhesives, it is a relatively slow process, particularly for larger panels in which a plurality of welds are needed to securely attach the fibrous sound absorbing material to the plastic panel. Because of the high cost of ultrasonic welding equipment, a single ultrasonic welding device is used to sequentially create a plurality of welds for a single part. As a result, cycle times are relatively high, and ultrasonic welding does not, in practice, provide a substantial cost advantage over adhesives.

Therefore, there remains a need for an economical method and apparatus for attaching a fibrous sound absorbing material to a plastic substrate without adhesives.

SUMMARY OF THE INVENTION

The invention provides an improved, economical, high speed method and apparatus for attaching a fibrous material to a plastic substrate.

The method of attaching a fibrous material to a plastic substrate involves positioning the fibrous material over a surface of the plastic substrate, and directing a stream of heated air through the fibrous material and at the surface of the plastic substrate which is under the fibrous material. The quantity of air and the temperature of the heated air are sufficient to melt the surface of the plastic substrate which is under the fibrous material. After the surface of the plastic substrate has melted, the fibrous material is pressed against the melted surface of the plastic substrate to cause the fibers of the fibrous material to become immersed in the melted plastic at the surface of the plastic substrate. After the fibers are pressed against the melted plastic, the melted surface of the plastic substrate is allowed to cool and resolidify. The fibers which were immersed in the melted plastic become embedded in the resolidified plastic, thus providing a durable physical bond between certain individual fibers of the fibrous material and the surface of the plastic substrate.

The apparatus for attaching the fibrous material to the plastic substrate includes a fixture for supporting the plastic substrate and a fibrous material disposed over at least part of a surface of the plastic substrate. The apparatus also includes a tool supported adjacent to the fixture, the tool including a workpiece-engaging surface which generally conforms with the surface of the plastic substrate, with the workpiece-engaging surface including at least one orifice in communication with a supply of heated, pressurized air. An actuator is provided for reciprocating the tool between a first position in which the workpiece-engaging surface of the tool is spaced away from the surface of the plastic substrate and away from the fibrous material overlying the plastic substrate, and a second position in which the workpiece-engaging surface of the tool compresses the fibrous material against the surface of the plastic substrate.

BRIEF DESCRIPTION OF THE DRAWINGS

FIG. 1 is a side elevational view, partially in cross section, of an apparatus for attaching a fibrous material to a plastic substrate in accordance with the principles of this invention, with the tool positioned above the plastic substrate and fibrous material, before the fibrous material is attached to the plastic substrate;

FIG. 2 is a side elevational view, partially in cross section, of the apparatus shown in FIG. 1, with the tool reciprocated downwardly into the fibrous material to achieve attachment of the fibrous material to the underlying plastic substrate;

FIG. 3 is a side elevational view, partially in cross section, of the apparatus, fibrous material, and plastic substrate shown in FIGS. 1 and 2, after the tool has been reciprocated away from the fibrous material and plastic substrate, after the fibrous material has been attached to the plastic substrate;

FIG. 4 is an enlarged side elevational view of the tool shown in FIGS. 1–3;

FIG. 5 is a bottom view of the tool shown in FIG. 4;

FIG. 6 is a top view of the tool shown in FIGS. 4 and 5;

DESCRIPTION OF THE PREFERRED EMBODIMENTS

Figure 8:
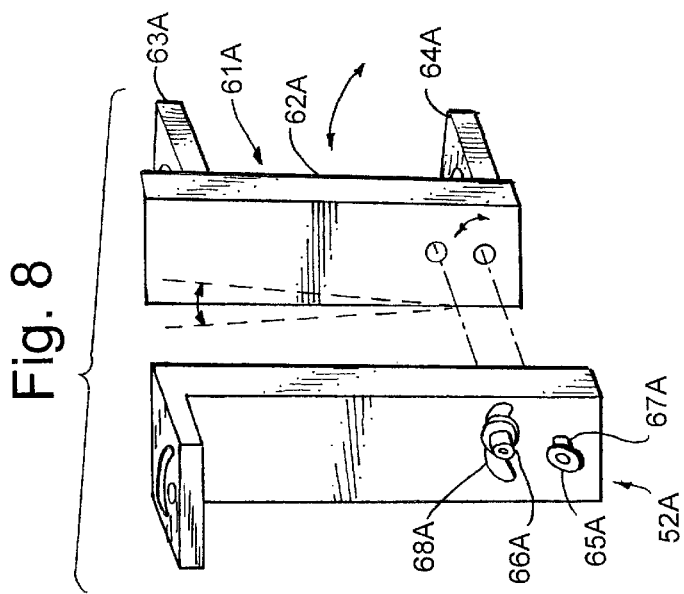
FIG. 8 is a perspective of the adjustable support components of the apparatus of FIG. 7.

An apparatus 10 for attaching a fibrous material 12 to a plastic substrate 14 is shown in FIGS. 1–3. In the illustrated embodiment, apparatus 10 includes a fixture 16 for supporting plastic substrate 14 and fibrous material 12, with fibrous material 12 generally positioned over plastic substrate 14. Fixture 16 is mounted on a platform 18. A support structure 19 is also mounted on platform 18. Support structure 19 supports a workpiece-engaging tool 20, and an actuator 22 for reciprocating workpiece-engaging tool 20 between a first position (as shown in FIGS. 1 and 3) in which workpiece-engaging tool 20 is spaced away from the surface of plastic substrate 14 and away from the overlying fibrous material 12, and a second position (as shown in FIG. 2) in which workpiece-engaging tool 20 compresses fibrous material 12 against a surface of plastic substrate 14. Illustrated actuator 22 is a pneumatic actuator comprising a cylinder 24 and a piston or rod 26 which reciprocates within cylinder 24. Piston 26 is fixed, at its lower end, to support structure 19. Attached to a lower end of cylinder 24 is a bracket 28 on which an air supply tube 30, air heater 32, and workpiece-engaging tool 20 are supported. Lower bracket 33 is fixed to air heater 32, and includes a bearing that slidably engages the lower end 26A of piston 26. Air can be supplied to air tube 30 by a flexible air supply line 34.

Although illustrated actuator 22 is a pneumatic actuator, actuator 22 may, as an alternative, be a hydraulic actuator, a motor driven screw type linear actuator, or any other suitable mechanical actuator for reciprocating workpiece-engaging tool 20 toward and away from fixture 16, plastic substrate 14, and overlying fibrous material 12.

Although air heater 32 is preferably an electrical resistance heater, it is conceivable that other types of heating devices may be employed, such as a hot oil to air heat exchanger.

As shown in FIGS. 4–5, the illustrated workpiece-engaging tool 20 is a plug-like fitting, including a threaded upper portion 36 which can be screwed to a coupling 38 connected to the lower end of air supply tube 30. The bottom of workpiece-engaging surface 40 conforms with the surface of plastic substrate 14 at which fibrous material 12 is attached to plastic substrate 14. In most cases, it is desirable that workpiece-engaging surface 40 be substantially flat because in general, it will be desirable to attach the fibrous material 12 to a flat surface of plastic substrate 14. However, the workpiece-engaging surface 40 of workpiece-engaging tool 20 can be curved, such as cylindrical or hemispherical, or comprised of two or more intersecting planar surfaces, to conform with more complicated surfaces of a plastic substrate if desired. In the illustrated embodiment, workpiece-engaging tool 20 includes five parallel bores or passageways 42 which extend longitudinally through the plug-like tool 20 from an upper surface 44 which is in fluid communication with air supply tube 30, to the workpiece-engaging surface 40, which is in contact with fibrous material 12 (as shown in FIG. 2) during the attachment operation. Also, the workpiece-engaging tool 20 includes two perpendicular grooves 47 formed on the flat end surface of the tool. The grooves 47 form a pair of criss-crossed raised ribs of fibrous material in the fibrous material 12 on the plastic substrate 14 that help stiffen and stabilize the fibrous material at the point of attachment, thus helping assure a good bond. The grooves 47 can also act as funnels for controlling air flow in a manner providing a more even distribution of heat. As illustrated, the bores 44 are positioned outside of the grooves 46, but they may also be positioned in the bores 44 if desired.

The invention has been illustrated with respect to a fibrous material 12 attached to plastic substrate 14 with an apparatus comprising a single tool for bonding the fibrous material 12 to plastic substrate 14. However, in most cases a plurality of tools would be used simultaneously for fusing fibrous material 12 to plastic substrate 14 at a plurality of different locations. For example, in the case of a relatively large plastic substrate 14, such as a door panel, it may be desirable to utilize twelve apparatuses 10 simultaneously to bond fibrous material 12 to a door panel at, for example, five to twenty distinct areas.

Fibrous material 12 is attached to plastic substrate 14 by first positioning plastic substrate 14 in registry with fixture 16, and thereafter positioning fibrous material 12 over plastic substrate 14, as shown in FIG. 1. Thereafter, actuator 22 is activated causing workpiece-engaging tool 20 to be displaced toward plastic substrate 14, compressing fibrous material 12 between plastic substrate 14 and workpiece-engaging surface 40 of tool 20. Hot air is blown through passageways 42 of tool 20, through fibrous material 12, and impinges upon a surface of plastic substrate 14, causing a surface portion 46 of plastic substrate 14 to melt. The pressure imposed upon fibrous material 12 by workpiece-engaging tool 20 causes fibers of fibrous material 12 to become immersed in melted plastic 46. Thereafter, tool 20 is reciprocated away from fibrous material 12, as shown in FIG. 3, and melted plastic portion 46 cools and resolidifies causing fibers of fibrous material 12 to become embedded within plastic substrate 14, thereby forming a strong physical bond between fibrous material 12 and plastic substrate 14. At the point of attachment, the fibrous material 12 forms a depression 46A having a pair of raised ribs of fibrous material in the shape of the grooves 47 that criss-cross the depression 46A in a manner adding strength to the fibrous material at the attachment.

Suitable plastic substrates generally include any of the thermoplastic materials typically employed in automotive interior panels, such as polypropylene, ABS, PET, etc. The fibrous material 12 is generally any fibrous material commonly employed in the automotive industry for sound absorption. Suitable sound absorbing fibrous materials include non-woven batts comprised of glass fibers, synthetic fibers, including shredded thermoplastic and/or thermoset resins, natural fibers, and combinations thereof.

The flow rate of hot air emerging from tool 20, penetrating fibrous material 12, and impinging upon plastic substrate 14, to melt a portion of plastic substrate 14, depends upon a variety of factors, including the thickness, composition and density of fibrous material 12, the melting point temperature of plastic substrate 14, and the desired area of the bond between fibrous material 12 and plastic substrate 14. Other factors which may be considered include the contact time between tool 20 and fibrous material 12, and the number, size and hole pattern for passageways 42. In the illustrated embodiment, workpiece-engaging surface 40 is approximately square, with dimensions of ⅜ inches by ⅜ inches. It has been found that for the illustrated tool, a hot air flow rate of about 80 standard and cubic feet per minute (SCFM), heated with a 400-watt heater, can be used to bond a quarter inch thick shotty to polypropylene in about 6 seconds. A suitable diameter for each of the five passageways 42 is about 0.063 inches. Smaller or larger passageways 42 may be used if desired. However, it is desirable that the cumulative cross-sectional area of all of the passageways 42 should be about equivalent to the cross-sectional area of a single one-quarter inch diameter passageway when a flow rate of 80 SCFM is used with a 400-watt heater. A plurality of passageways 42, such as five, is preferred as compared to a single passageway having an equivalent cross-sectional area. This is because a single one-quarter inch passageway tends to concentrate too much heat into too small of an area, causing certain fibrous materials, such as typical shotties to burn or otherwise deteriorate. A suitable pressure of tool 20 on fibrous material 12 is about 80 psi, although this can be varied as desired depending upon the fibrous material employed. Tool 20 can be made from generally any machinable material, with brass currently being a preferred material. However, it is believed that a ceramic tool may have advantages, because it will remain cooler, whereby more heat will be directed toward plastic substrate 14, where it is most desired, not at fibrous material 12.

A four passageway 42 pattern as shown in FIGS. 5 and 6 is most preferred, as it provides uniform heating and results in an excellent bond between a typical substrate (e.g., polypropylene) and typical shotty batts. Preferably a plurality of edge passageways engaging surface 40 are preferred, with the edge passageways preferably being about 1/16 inch or less from the edge of workpiece-engaging surface 40. The edge passageways are preferably uniformly angularly spaced apart around the center of workpiece-engaging surface 40, irrespective of whether there is a cooler passageway.

Figure 7:
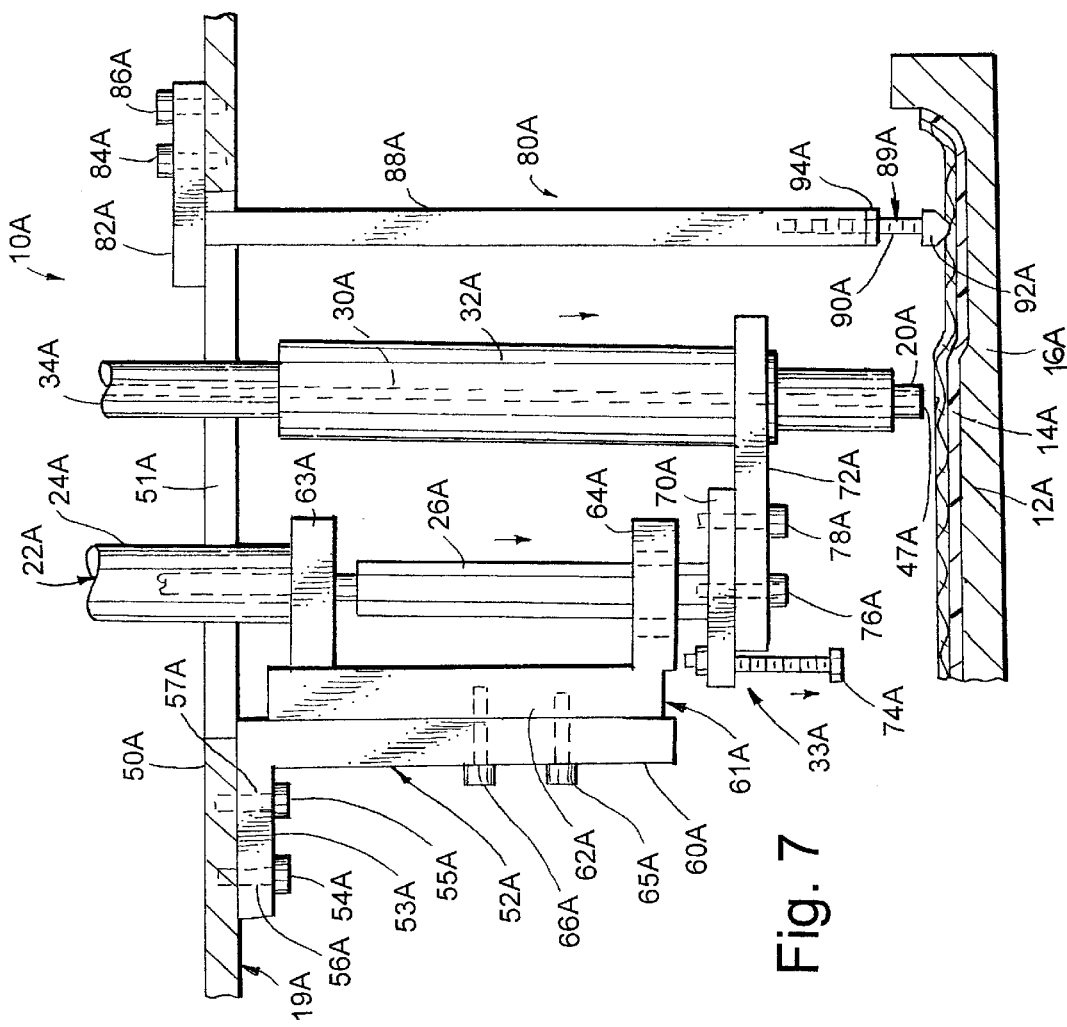
FIG. 7 is a fragmentary side view, partially in cross section, of a modified apparatus in accordance with the principles of the present invention.

A modified apparatus 10A (FIGS. 7–8) includes features and components that are similar to and/or that are identical to the apparatus 10. In modified apparatus 10A, these similar and identical features and components are identified by using identical numbers along with a letter "A". This is done to reduce redundant discussion, and not for another reason.

The support structure 19A includes a plate 50A (FIG. 8) having an opening 51A. An L bracket 52A includes a first leg 53A attached by two bolts 54A and 55A that extend through a hole 56A and a slot 57A into threaded holes in the plate 50A. The slot 57A extends arcuately around the hole 56A, such that the L bracket 52A can be rotated even with the bolts 54A and 55A in place. Specifically, by loosening the bolts 54A and 55A, the bracket 52A can be angularly adjusted by rotation about hole 56A to a desired position. Thereafter, the bolts 54A and 55A are re-tightened to hold the selected position. The bracket 52A includes a second leg 60A that extends downwardly. A C-shaped bracket 61A includes a vertical leg 62A and top and bottom horizontal legs 63A and 64A. The vertical leg 62A abuts the second leg 60A, and is secured to the second leg 60A by bolts 65A and 66A that extend through a hole 67A and slot 68A into threaded holes in the vertical leg 62A. By loosening the bolts 65A and 66A, the bracket 61A can be anularly adjusted by rotation about hole 67A to a desired position. Thereafter, the bolts 65A and 66A are re-tightened to hold the selected position. This "two angle" adjustment is important because it allows an operator to setup the apparatus 10A so that the tool 20A extends perpendicularly into engagement with the fibrous material 12A and substrate 14A, despite angled surfaces 13A that occur in the substrate 14A.

Cylinder 24A of actuator 22A is attached to the top leg 63A, and the extendable rod 26A (the lower end of which is hex shaped in cross section to resist rotation) extends through the top leg 63A and through the bottom leg 64A, slidably engaging the bottom leg 64A. The actuator 22A is connected to a fluid source as previously described in regard to apparatus 10. A bracket 33A is attached to the lower end of the rod 26A, and includes a first bracket plate 70A attached directly to the rod 26A and a second bracket plate 72A. A threaded stop rod 74A is threaded into the first bracket plate 70A, and is adjusted to a position where the stop rod 74A will engage a stop on the tool 16A to prevent damage to the apparatus 10A. The second bracket plate 72A is bolted to the first bracket plate 70A by bolts 76A and 78A, with the bolt 76A extending through a hole and the bolt 78A extending through a slot in the second plate 72A. Thus, the second bracket plate 72A is angularly adjustable in a fashion similar to the earlier described arrangements for pairs of bolts 54A and 55A, and also bolts 65A and 66A. This allows for quick and easy adjustment at the point of use of apparatus 10A, even when the equipment is hot.

An elongated batt-holder device 80A (FIG. 7) includes a bracket plate 82A attached to the plate 50A (either to its top surface or its bottom surface) by bolts 84A and 86A. Where desired, the bolts 84A and 86A can extend through a hole and slot as previously described in regard to bolts 65A and 66A, thus allowing adjustability of the bracket plate 82A. A rigid rod 88A extends downwardly from the bracket plate 82A. A pressure foot 89A includes a threaded rod 90A that threadingly engages a threaded hole in the end. of the rigid rod 88A, and further includes a rubber foot 92A. By adjusting the threaded rod 90A and locking it in an adjusted position by the lock nut 94A, the foot 92A can be adjusted so that it contacts the fibrous material 12A and substrate 14A to hold them in position while the apparatus 10A works.

During operation of apparatus 10A, the fixture 16A is initially raised, such that the fibrous material 12A and substrate 14A come into contact with the foot 92A. The actuator 22A extends piston 26A, causing the assembly of the bracket plate 70A and 72A and air supply heater 30A to extend and heat the selected location, which results in the melted plastic 46A. The actuator 22A extends about 1/16 inch to 1/4 inch when it is extended, causing the tool 20A to press the fibrous material 12A against the substrate 14A. After a surface of the substrate is melted, the pressure is held for a short time, which results in the depression 46A (FIG. 1).

Although the invention has been described with respect to attachment of fibrous material to automotive interior panels, such as door panels, interior trim panels, pillar panels, headliners, dashes, lift-gate panels, and visors, the apparatus and methods of the invention can be employed for attaching any of a variety of fibrous materials, especially non-woven fibrous batts, to any of a variety of thermoplastic substrates, for generally any application.

It will become apparent to those skilled in the art that various modifications to the preferred embodiments of the invention can be made without departing from the spirit or scope of the invention as defined by the appended claims.

The embodiments of the invention in which an exclusive property or privilege is claimed are defined as follows:

1. An apparatus for attaching a fibrous material to a plastic substrate, comprising:

a fixture for supporting a plastic substrate and a fibrous material over a surface of the plastic substrate;

a tool supported adjacent the fixture, the tool including a workpiece-engaging surface which generally conforms with the surface of the plastic substrate, the workpiece-engaging surface including a plurality of passageways in communication with a supply of heated, pressurized air; and an actuator for reciprocating the tool between a first position in which the workpiece-engaging surface of the tool is spaced away from the surface of the plastic substrate and spaced away from the fibrous material, and a second position in which the workpiece-engaging surface of the tool compresses the fibrous material against the surface of the plastic substrate.

2. The apparatus of claim 1, wherein the actuator is a pneumatic actuator.

3. The apparatus of claim 1, wherein the actuator is a hydraulic actuator.

4. The apparatus of claim 1, wherein the actuator is a motor driven actuator.

5. The apparatus of claim 1, further comprising an electric resistance heater for heating pressurized air and thereby supplying the heated, pressurized air.

6. The apparatus of claim 1, wherein the workpiece-engaging surface of the tool is substantially flat.

7. The apparatus of claim 1, wherein the workpiece-engaging surface of the tool has five passageways including a passageway located at the center of the workpiece-engaging surface, and four other passageways located between the center of the workpiece-engaging surface and edges of the workpiece-engaging surface.

8. The apparatus of claim 1, wherein the tool is made of brass.

9. The apparatus of claim 1, wherein the tool is made of ceramic.

10. The apparatus of claim 1, wherein the cumulative cross-sectional area of the passageways is about equivalent to the cross-sectional area of a single one-quarter inch diameter passageway.

11. The apparatus of claim 1, wherein each of the passageways has a cross-sectional diameter of about 0.063 inches.

12. The apparatus of claim 1, wherein the plurality of passageways include a single passageway located at the center of the workpiece-engaging surface of the tool, and the remaining passageways are located between the center of the workpiece-engaging surface of the tool and edges of the workpiece-engaging surface of the tool.

13. The apparatus of claim 12, wherein each of the passageways, except for the passageway at the center of the workpiece-engaging surface, are about $\frac{1}{16}$ inch or less from an edge of the workpiece-engaging surface.

14. The apparatus of claim 12, wherein the passageways between the center and an edge of the workpiece-engaging surface are uniformly angularly spaced apart around the center of the workpiece-engaging surface.

* * * * *